US012251961B2

(12) United States Patent
Solimar Walter

(10) Patent No.: US 12,251,961 B2
(45) Date of Patent: Mar. 18, 2025

(54) VEHICLE HAVING A TILTING AXLE AND RELATED METHODS

(71) Applicant: AGCO do Brasil Soluções Agrícolas Ltda., Ribeirao Preto (BR)

(72) Inventor: Airton Solimar Walter, Nova Sant Rita (BR)

(73) Assignee: AGCO do Brasil Soluções Agrícolas Ltda., Ribeirao Preto (BR)

( * ) Notice: Subject to any disclaimer, the term of this patent is extended or adjusted under 35 U.S.C. 154(b) by 822 days.

(21) Appl. No.: 17/447,062

(22) Filed: Sep. 7, 2021

(65) Prior Publication Data

US 2022/0080772 A1    Mar. 17, 2022

(30) Foreign Application Priority Data

Sep. 14, 2020  (GB) .................................... 2014403

(51) Int. Cl.
  *B62D 6/00*   (2006.01)
  *B60B 35/10*  (2006.01)
  *B62D 1/181*  (2006.01)
  *B62D 49/06*  (2006.01)

(52) U.S. Cl.
  CPC ............ *B60B 35/109* (2013.01); *B62D 1/181* (2013.01); *B62D 6/005* (2013.01); *B62D 49/0678* (2013.01); *B60Y 2200/221* (2013.01); *B60Y 2200/222* (2013.01)

(58) Field of Classification Search
  CPC .... B62D 1/181; B62D 6/005; B62D 49/0678; B60Y 2200/221; B60Y 2200/222
  See application file for complete search history.

(56) References Cited

U.S. PATENT DOCUMENTS

| 6,056,501 A * | 5/2000 | Ishikawa ............... B66F 9/0755 280/124.112 |
| 8,280,590 B2 * | 10/2012 | Mackin ................ B60G 17/005 701/41 |
| 8,517,394 B2 * | 8/2013 | Pfiffner .................... B62D 9/00 280/5.514 |

(Continued)

FOREIGN PATENT DOCUMENTS

| CN | 108437733 A | 8/2018 |
| WO | 2010/116605 A1 | 10/2010 |

OTHER PUBLICATIONS

UK Intellectual Property Office, Search Report for UK Priority Application No. 2014403.6, dated Feb. 12, 2021.

*Primary Examiner* — Kevin Hurley
*Assistant Examiner* — Michael R Stabley

(57) ABSTRACT

A vehicle includes a chassis, an axle pivotally coupled to the chassis such that the axle can tilt from side to side relative to the chassis, a tilt-angle sensor configured to detect a tilt angle of the axle relative to the chassis, and steerable hubs carried by the axle. Each hub is configured to rotate about steering axes relative to the axle, and a steering-angle sensor is configured to detect a steering angle of at least one hub relative to the axle. A control system limits a maximum steering angle of the hubs based at least in part on a size of tires or tracks carried by the steerable hubs and the detected tilt angle of the axle. A method includes detecting a tilt angle of the axle relative to the chassis and limiting the maximum steering angle of the hubs.

5 Claims, 4 Drawing Sheets

(56) References Cited

U.S. PATENT DOCUMENTS

| | | | |
|---|---|---|---|
| 8,919,789 B2* | 12/2014 | Nelson | B60G 9/04 |
| | | | 280/6.154 |
| 9,561,819 B2* | 2/2017 | Tuttle | B62D 6/001 |
| 10,577,013 B2* | 3/2020 | Weber | B62D 15/025 |
| 10,704,226 B2* | 7/2020 | Yamaguchi | B60G 1/02 |
| 2014/0260152 A1 | 9/2014 | Nelson et al. | |
| 2019/0220023 A1 | 7/2019 | Noess | |
| 2019/0220024 A1 | 7/2019 | Noess | |
| 2019/0220031 A1 | 7/2019 | Noess | |

\* cited by examiner ured to embody one or more of the methods of operating
VEHICLE HAVING A TILTING AXLE AND RELATED METHODS

CROSS REFERENCE TO RELATED APPLICATIONS

This application claims the benefit of the filing date of United Kingdom Patent Application 2014403.6, "Vehicle Having a Tilting Axle and Related methods," filed Sep. 14, 2020, the entire disclosure of which is incorporated herein by reference.

FIELD

Embodiments of the present disclosure relate generally to control and steering of vehicles. In particular, embodiments relate to control of machines, such as tractors or combine harvesters, having at least one tilt axle.

BACKGROUND

Self-propelled combine harvesters are used by farmers to harvest a wide range of crops. Typically, a combine harvester cuts crop material, threshes grain therefrom, separates the threshed grain from the straw, and cleans the grain before storage in an onboard tank. Straw and crop residue is ejected from the rear of the combine harvester in the field.

Combine harvesters typically include a cleaning unit to separate grain and chaff (also referred to in the art as material other than grain (MOG)). The cleaned grain is conveyed to a discharge auger that elevates the grain to an onboard storage bin, whereas MOG and possibly unthreshed grain are directed over the edge of a bottom sieve assembly to a different discharge outlet for recirculation back through the thresher rotor assembly and cleaning system to extract any unthreshed grain. A fan of the cleaning system produces an airstream through the cleaning system that entrains the lighter non-grain particles and carries them out the rear of the combine harvester.

Because cleaning units typically rely on gravity to assist in separation, it is beneficial if the combine harvester is kept level relative to gravity, regardless of the ground terrain. Combine harvesters may be equipped with one or more tilting axles to keep the combine harvester level in a wide variety of terrains (e.g., sloped, bumpy, etc.).

BRIEF SUMMARY

In some embodiments, a vehicle includes a chassis, an axle pivotally coupled to the chassis such that the axle can tilt from side to side relative to the chassis, a tilt-angle sensor configured to detect a tilt angle of the axle relative to the chassis, and a pair of steerable hubs carried by the axle. Each hub is configured to rotate about steering axes relative to the axle, and a steering-angle sensor is configured to detect a steering angle of at least one hub relative to the axle. The vehicle includes a control system configured to limit a maximum steering angle of the hubs based at least in part on a size of tires or tracks carried by the hubs and the detected tilt angle of the axle.

In some embodiments, a method of operating a vehicle includes detecting a tilt angle of an axle relative to a chassis of the vehicle. The axle carries a pair of hubs configured to rotate about steering axes relative to the axle. A maximum steering angle of the pair of hubs is limited based at least in part on a size of tires or tracks carried by the hubs and the detected tilt angle of the axle

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments when read in conjunction with the accompanying drawings, in which:

DETAILED DESCRIPTION

Figure 1:
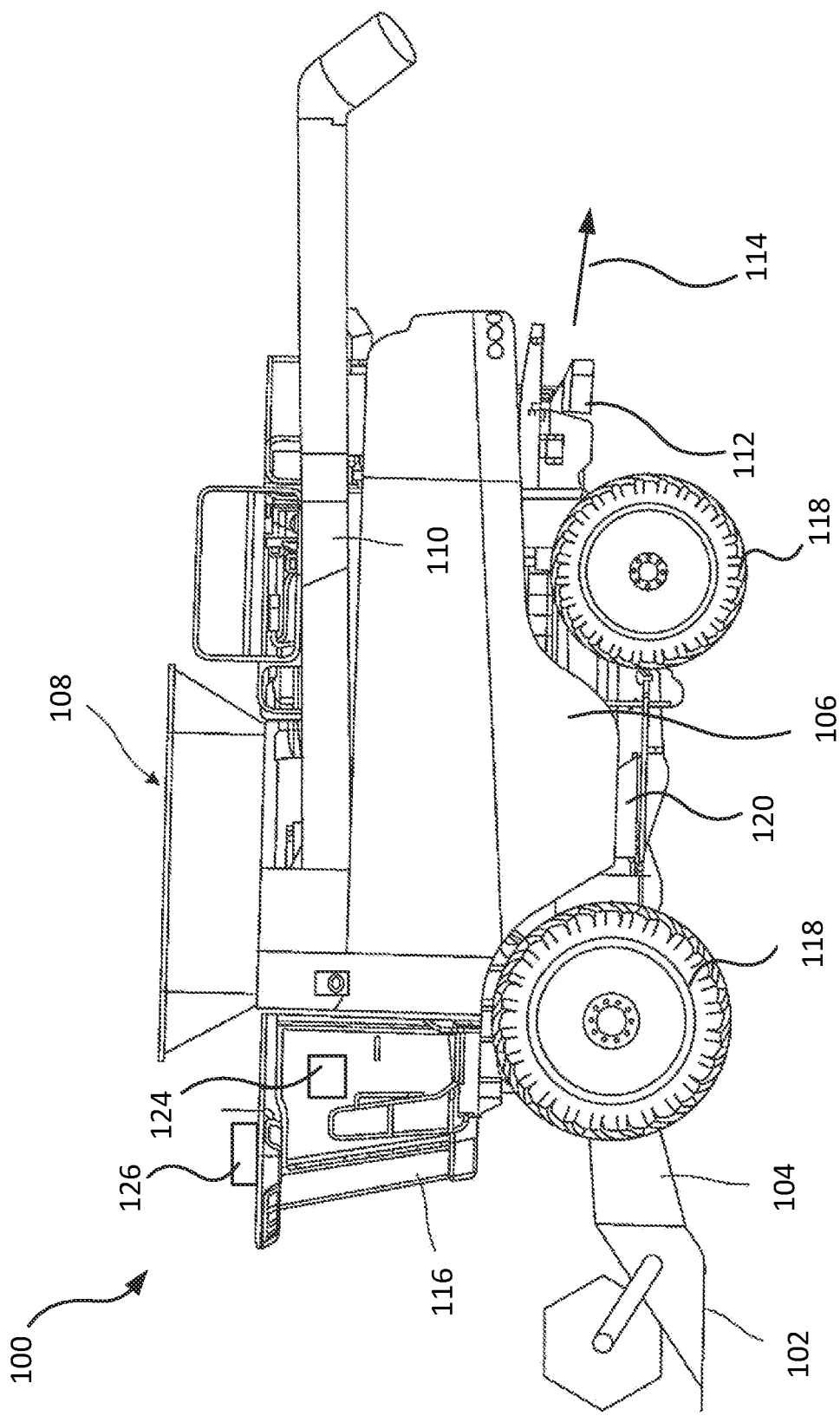
FIG. 1 is a simplified side view of a combine harvester.

The illustrations presented herein are not actual views of any particular machine or portion thereof, but are merely idealized representations employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

FIG. 1 illustrates an agricultural vehicle in the form of a self-propelled combine harvester 100 that carries a header 102, which cuts and gathers a strip of crop as the combine harvester 100 is driven across a crop field. An elevator section 104 conveys the cut crop stream from the header 102 into a crop processing apparatus 106 in the combine harvester 100. Clean grain separated from the crop stream is collected in a storage tank 108, which is periodically emptied into a trailer or other vehicle or storage container via an unloading auger 110. Residue material remaining from the crop stream, such as straw and chaff, is ejected by a spreading system 112 from the rear of the combine harvester 100, represented by arrow 114. The combine harvester 100 also typically includes an operator cab 116, an engine, and wheels 118 and/or tracks. The elevator section 104, crop processing apparatus 106, storage tank, cab 116, engine, and other components are carried by a chassis 120 or frame supported by the wheels 118 and/or tracks.

In some embodiments, a computer 124 may be located in the cab 116. Alternatively, the computer 124 may be located elsewhere, and may have a user interface in the cab 116. A GPS antenna 126 may be used by the computer 124 to determine the location of the combine harvester 100.

Figure 2:
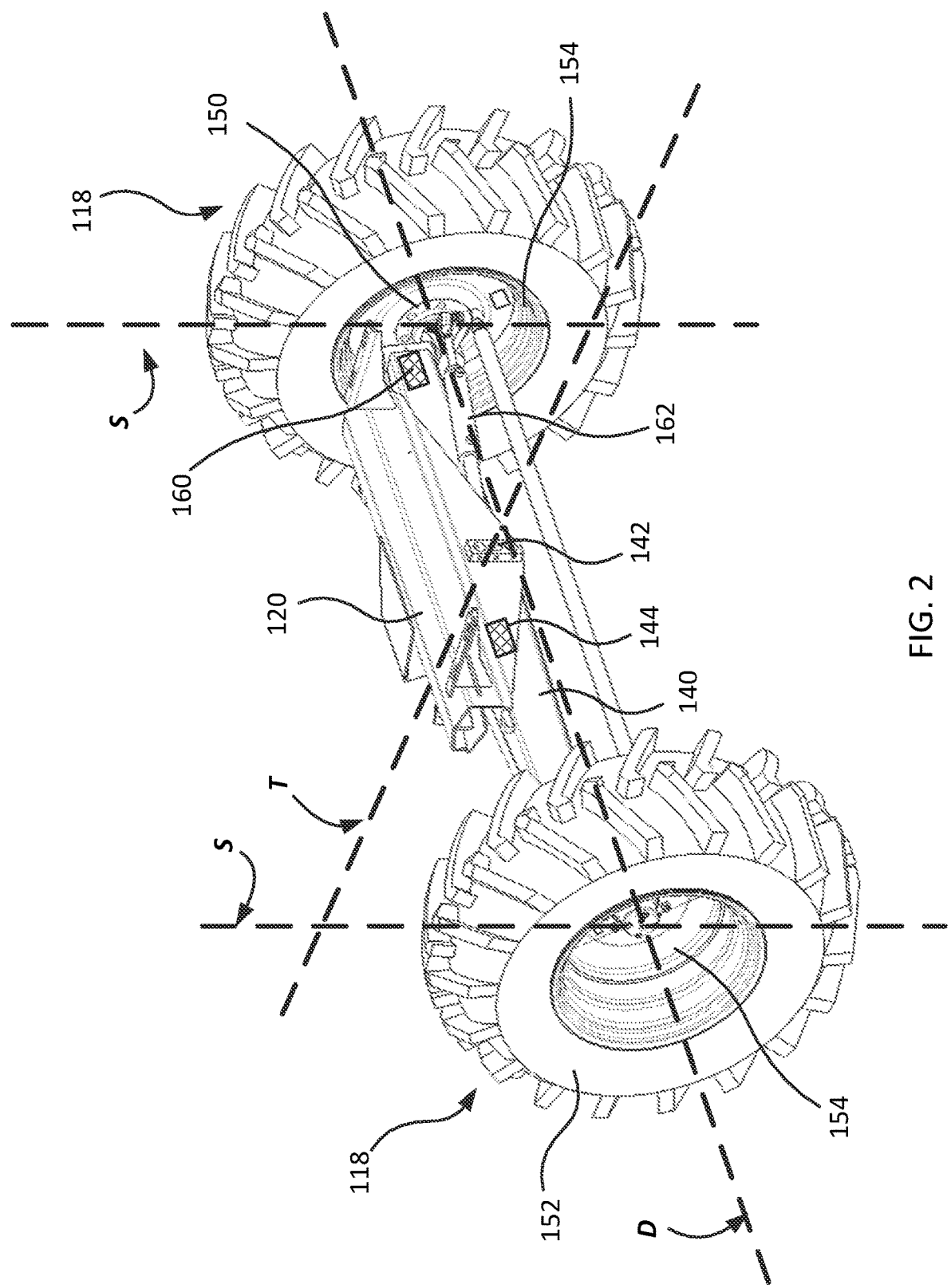
FIG. 2 is a perspective view of an axle and two wheels of the combine harvester of FIG. 1.

FIG. 2 is a simplified perspective view of two of the wheels 118 of the combine harvester 100 coupled to one another by an axle 140. The axle 140 is pivotally coupled to the chassis 120 (only a portion of which is shown in FIG. 2). The axle 140 is configured to tilt from side to side relative to the chassis 120 by pivoting about a tilt axis T. The axle 140 is connected to the chassis 120 at a pivot joint 142, through which the tilt axis T passes. A tilt angle of the axle 140 relative to the chassis 120 may be detected by one or more tilt-angle sensors 144 coupled to the chassis 120 and/or the axle 140. For example, the tilt-angle sensor(s) 144 may include potentiometers, proximity sensors, angular sensors, rotary position sensors, or any other selected sensor type. The tilt-angle sensor(s) 144 may provide a signal to the computer 124 corresponding to the tilt angle of the axle 140. The computer 124 may use the tilt angle to control or limit the steering of the combine harvester 100 as described in further detail below.

The wheels 118 each include a rim 154 and a tire 152. The rims 154 are fixed to steerable hubs 150, which connect to the axle 140 and rotate about a drive axis D that runs though the center of the wheels 118. As the combine harvester 100 travels, the wheels 118 rotate about the drive axis D. The hubs 150 are also configured to rotate (steer) relative to the axle 140 about steering axes S. For example, the hubs 150 may steer left or right up to 20°, up to 30°, up to 45°, or more. The hubs 150 typically cannot make full 360° rotations about the steering axes S. Typically, the steering axes S are parallel to one another and oriented approximately vertical, though different steering mechanisms may cause the steering axes S to change. When the hubs 150 are each oriented to direct the combine harvester 100 forward (i.e., neither left nor right), the hubs 150 share a common drive axis D; when the hubs 150 are oriented to turn the combine harvester 100, each hub 150 has a unique drive axis D.

One or more steering-angle sensors 160 may detect the angle of the hubs 150 relative to the axle 140 (i.e., about the steering axes S). The steering-angle sensor(s) 160 may be coupled to both hubs 150, to one hub 150, and/or to a control component connected to the hubs 150. For example, the steering-angle sensor(s) 160 may be connected to an actuator 162 that controls steering of the hubs 150. Though only one steering-angle sensor 160 appears in FIG. 2, it should be understood that another steering-angle sensor 160 may be configured to detect the angle of the opposite hub 150. Furthermore, additional steering-angle sensor(s) 160 may be used for redundancy, calibration, etc. The steering-angle sensor(s) 160 may provide a signal to the computer 124 corresponding to the steering angle of the hubs 150. The computer 124 may use the steering angle to determine whether the wheels 118 are within an appropriate orientation based on tire size and the tilt angle.

The computer 124 may include a control system configured to limit a maximum steering angle of the hubs 150 based at least in part on a size of tires 152 carried by the hubs 150 and the tilt angle of the axle 140 as detected by the tilt-angle sensor(s) 144. For example, if tires 152 of a relatively larger size (e.g., diameter and/or width) are installed, the control system may limit the maximum steering angle to a lower angle than if smaller tires 152 are installed, so as to prevent contacting the tires 152 with the chassis 120 or other parts of the combine harvester 100. Furthermore, for the same reason, if the axle 140 is tilted a maximum amount, the control system may limit the maximum steering angle to a lower angle than if the axle 140 is level with the chassis 120.

The computer 124 may include in memory a lookup table that correlates the tilt angle to the maximum steering angle. The control system of the computer 124 may consult the lookup table to determine the maximum steering angle to be used. For example, Table 1 below shows a lookup table that may be used by the control system to determine the maximum steering angle.

TABLE 1

| Max steering angle for large tire size | |
|---|---|
| Tilt angle | Max steering angle |
| 0° to ±3° | ±20° |
| ±3° to ±6° | ±15° |
| ±6° to ±9° | ±10° |
| ±9° to ±12° | ±5° |

Table 2 below shows another lookup table that may be used by the control system if the combine harvester 100 has tires 152 of a smaller size.

TABLE 2

Max steering angle for small tire size

| Tilt angle | Max steering angle |
|---|---|
| 0° to ±3° | ±22° |
| ±3° to ±6° | ±19° |
| ±6° to ±9° | ±16° |
| ±9° to ±12° | ±13° |

The lookup tables may be generated by modeling or measuring the positions of tires 152 of various sizes relative to the chassis 120 at different tilt angles and steering angles. The maximum steering angle can be set at or below the steering angles that cause interference between the tires 152 and the chassis 120 for a given tilt angle. Thus, a control system using the lookup table for a particular tire size may prevent those tires 152 from contacting the chassis 120 in various field conditions.

The combine harvester 100 may, in some embodiments, have one or more telescopic axles. When the axle 140 is retracted (i.e., the width between the tires 152 is at its smallest), the maximum steering angle may be set to be smaller than the maximum steering angle when the axle 140 is extended (i.e., the width between the tires 152 is at its greatest). Thus, if the axle 140 is telescopic, the computer 124 may include lookup tables for different extension widths of the axle 140.

The control system may also be used in conjunction with an automatic steering system, to enable the system to avoid damage to the combine harvester 100 caused by turning too sharply. Automatic steering systems are disclosed in, for example, U.S. Patent Publication 2019/0220023 A1, "Steering Controller for an Autonomous Vehicle," published Jul. 18, 2019; U.S. Patent Publication 2019/0220031 A1, "Steering Controller for an Autonomous Vehicle with Velocity Regulation, published Jul. 18, 2019; and U.S. Patent Publication 2019/0220024 A1, "Steering Controller for an Autonomous Vehicle with Stability Regulation, published Jul. 18, 2019.

Though only one axle 140 and one pair of wheels 118 are shown in FIG. 2, the combine harvester 100 may have both axles and both pairs of wheels 118 configured as described and shown in FIG. 2. Alternatively, one axle may be fixed relative to the chassis 120, and/or the wheels 118 attached to that axle may not steer. Furthermore, the combine harvester 100 may have any number of axles, any or all of which may be configured as shown in FIG. 2. Some axles, including those configured as described, may have more than two tires 152 (e.g., four tires, six tires, etc.). In some embodiments, the tires 152 may be replaced with tracks, and the steerable hubs 150 may include a mechanism to drive the tracks to move the combine harvester 100. The axle 140 and control system described herein may also be used for any other type of agricultural or other vehicle, such as tractors, spray applicators, dump trucks, semi-trucks, passenger vehicles, recreational vehicles, etc.

Figure 3:
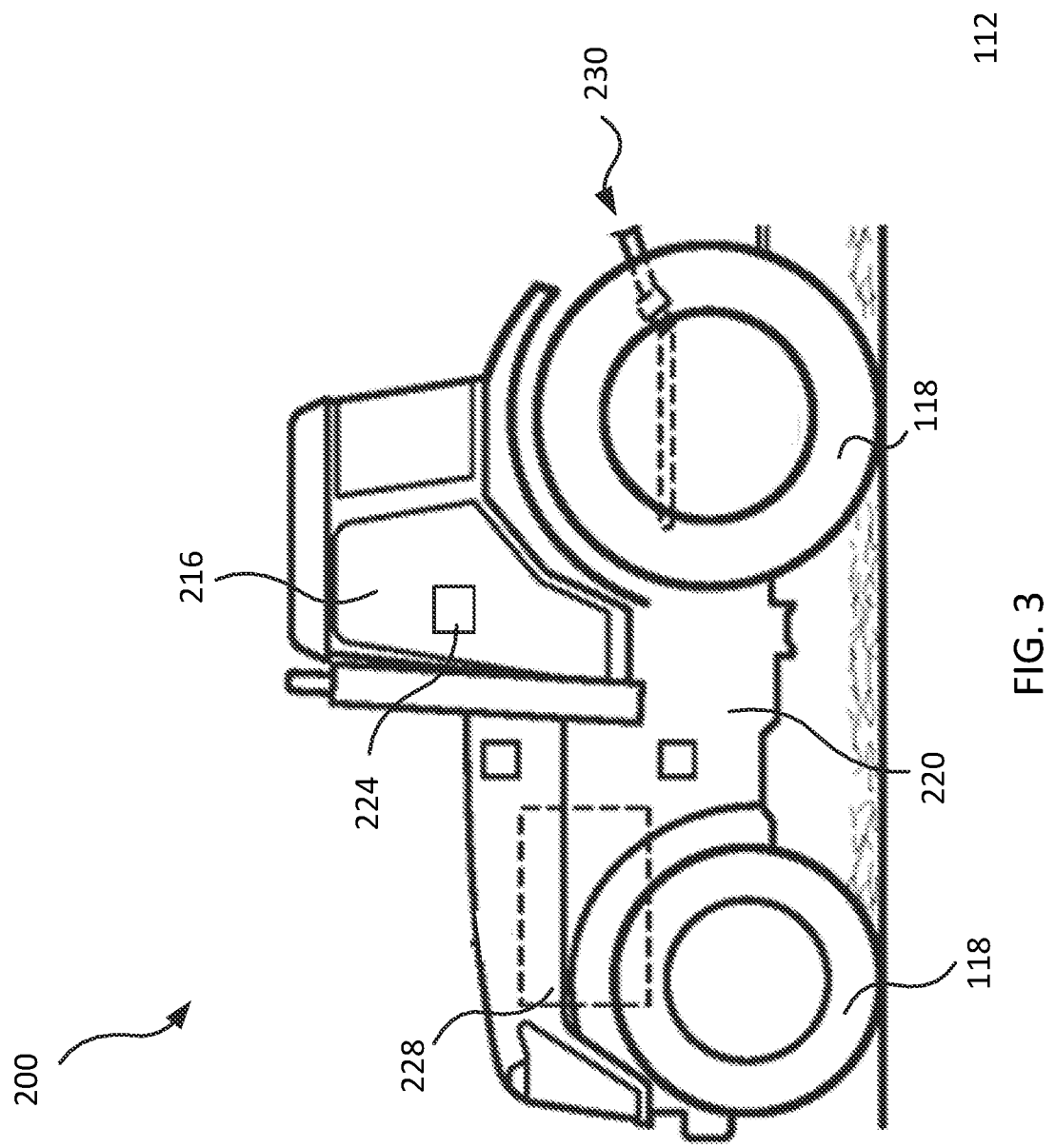
FIG. 3 is a simplified side view of a tractor.

For example, FIG. 3 illustrates a tractor 200 having an operator cab 216, a computer 224, an engine 228, and tow hitch 230 (e.g., a three-point hitch). The tractor 200 may have wheels 118 as described and shown in FIG. 2. The cab 216, engine 228, and other components are carried by a chassis 220 or frame supported by the wheels 118.

Figure 4:
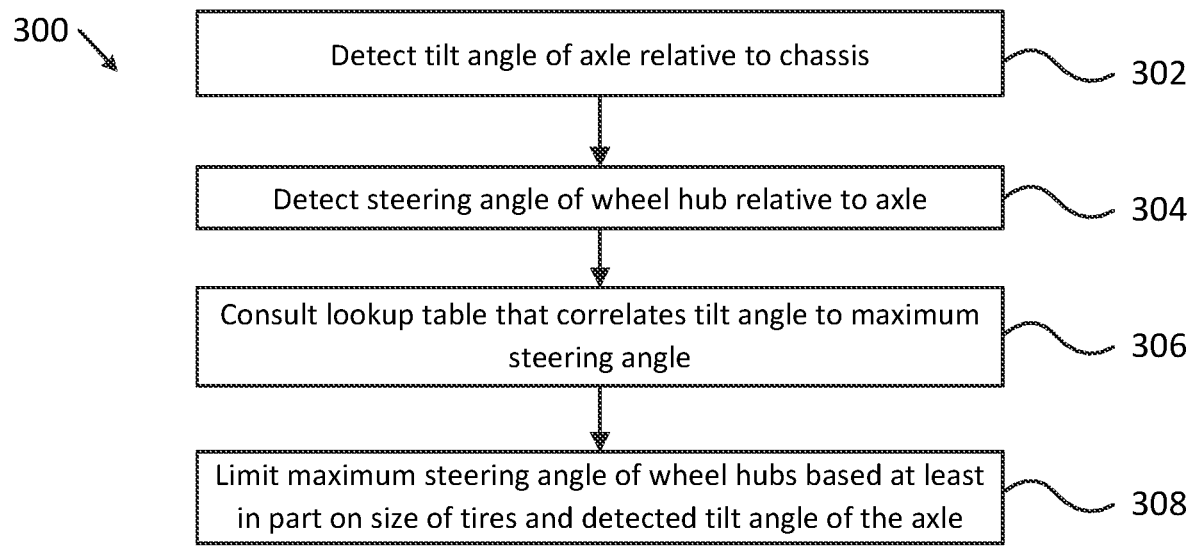
FIG. 4 is a simplified flow chart illustrating a method of operating a vehicle.

FIG. 4 is a simplified flow chart illustrating a method 300 of operating a vehicle. In block 302, a tilt angle of an axle is detected relative to a chassis of the vehicle. In block 304, a steering angle of at least one wheel hub carried by the axle is detected. Block 306 represents consulting a lookup table that correlates tilt angle of the axle to a maximum steering angle. The lookup table may vary based on tire size. Block 308 represents limiting the maximum steering angle of the wheel hubs based on the tire size and the detected tilt angle, such as to the maximum steering angle indicated in the lookup table. Though depicted as a flow chart, the actions in FIG. 4 may be performed concurrently, and in some embodiments, some actions may be omitted.

Figure 5:
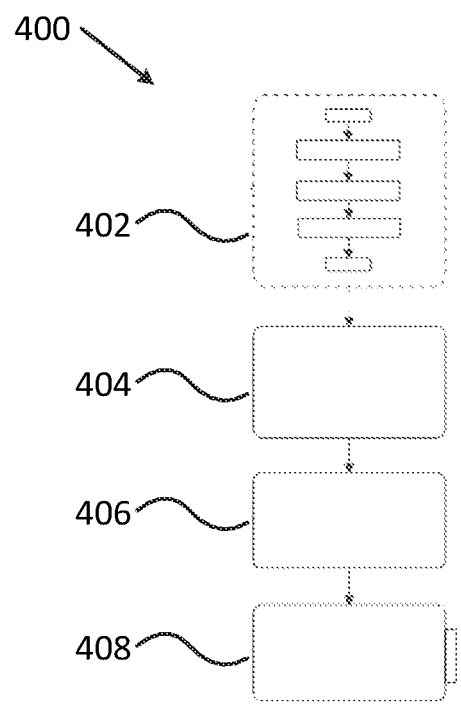
FIG. 5 illustrates an example computer-readable storage medium comprising processor-executable instructions configured to embody one or more of the methods of operating a vehicle, such as the method illustrated in FIG. 4.

Still other embodiments involve a computer-readable storage medium (e.g., a non-transitory computer-readable storage medium) having processor-executable instructions configured to implement one or more of the techniques presented herein. An example computer-readable medium that may be devised is illustrated in FIG. 5, wherein an implementation 400 includes a computer-readable storage medium 402 (e.g., a flash drive, CD-R, DVD-R, application-specific integrated circuit (ASIC), field-programmable gate array (FPGA), a platter of a hard disk drive, etc.), on which is computer-readable data 404. This computer-readable data 404 in turn includes a set of processor-executable instructions 406 configured to operate according to one or more of the principles set forth herein. In some embodiments, the processor-executable instructions 406 may be configured to cause a computer 124 associated with the vehicle (FIG. 1) to perform operations 408 when executed via a processing unit, such as at least some of the example method 300 depicted in FIG. 3. In other embodiments, the processor-executable instructions 406 may be configured to implement a system, such as at least some of the example combine harvester 100 depicted in FIG. 1 or the tractor 200 depicted in FIG. 3. Many such computer-readable media may be devised by those of ordinary skill in the art that are configured to operate in accordance with one or more of the techniques presented herein.

The control system and sensor(s) 144, 160 disclosed may be beneficial to improve performance of the vehicle, particularly in turning. Because some turns take place on sloped terrain, conventional vehicles may limit the steering angle (and therefore the turning radius of the vehicle) to those steering angles that do not cause interference when the axle is tilted its maximum amount (i.e., on a relatively steep slope). However, with the system disclosed herein, only turns on such sloped terrain are this limited. Turns on flat terrain or less-sloped terrain benefit from a larger permitted steering angle (and smaller turning radius), and thus the vehicle may be more maneuverable than conventional vehicles. Put another way, conventional vehicles may be mechanically or electronically limited so that the maximum axle tilt angle plus the maximum steering angle together do not cause interference between the tires and the chassis. Vehicles disclosed herein may allow a higher maximum steering angle when the axle tilt is lower than its maximum, yet still not cause interference between the tires 152 and the chassis 120.

Additional Non Limiting Example Embodiments of the Disclosure are Described Below Embodiment 1: A vehicle comprising a chassis, an axle pivotally coupled to the chassis such that the axle can tilt from side to side relative to the chassis, a tilt-angle sensor configured to detect a tilt angle of the axle relative to the chassis, a pair of steerable hubs carried by the axle, a steering-angle sensor configured to detect a steering angle of at least one hub of the pair of hubs relative to the axle, and a control system configured to limit a maximum steering angle of the at least one hub based at least in part on a size of tires or tracks carried by the pair of hubs and the detected tilt angle of the axle. Each hub is configured to rotate about steering axes relative to the axle.

Embodiment 2: The vehicle of Embodiment 1, wherein the vehicle comprises a second axle coupled to the chassis and a second pair of hubs carried by the second axle.

Embodiment 3: The vehicle of Embodiment 2, wherein the second axle is pivotally coupled to the chassis, and each hub is steerable and configured to rotate about steering axes relative to the second axle. The vehicle further comprises a second tilt-angle sensor configured to detect a tilt angle of the second axle, and a second steering-angle sensor configured to detect a steering angle of at least one hub of the pair of hubs relative to the second axle.

Embodiment 4: The vehicle of Embodiment 2, wherein the second axle is fixed relative to the chassis.

Embodiment 5: The vehicle of Embodiment 2 or Embodiment 4, wherein the second pair of hubs are not steerable.

Embodiment 6: The vehicle of any one of Embodiment 1 through Embodiment 5, wherein the hubs each carry tires mounted on rims.

Embodiment 7: The vehicle of any one of Embodiment 1 through Embodiment 5, wherein the hubs each carry tracks.

Embodiment 8: The vehicle of any one of Embodiment 1 through Embodiment 7, wherein the vehicle comprises a combine harvester, and wherein the chassis is configured to carry a harvesting header.

Embodiment 9: The vehicle of any one of Embodiment 1 through Embodiment 7, wherein the vehicle comprises a tractor.

Embodiment 10: The vehicle of any one of Embodiment 1 through Embodiment 9, wherein the axle is telescopic, and wherein the control system is configured to limit the maximum steering angle based at least in part on an extension width of the axle.

Embodiment 11: A method of operating a vehicle comprising detecting a tilt angle of an axle relative to a chassis of the vehicle. The axle carries a pair of steerable hubs configured to rotate about steering axes relative to the axle. A maximum steering angle of the pair of hubs is limited based at least in part on a size of tires or tracks carried by the hubs and the detected tilt angle of the axle.

Embodiment 12: The method of Embodiment 11, further comprising detecting a steering angle of at least one hub relative to the axle and comparing the detected steering angle to the maximum steering angle.

Embodiment 13: The method of Embodiment 11 or Embodiment 12, wherein limiting a maximum steering angle of a pair of hubs comprises consulting a lookup table that correlates the tilt angle to the maximum steering angle.

Embodiment 14: The method of Embodiment 13, further comprising selecting the lookup table based on the size of the tires or tracks carried by the hubs.

Embodiment 15: The method of any one of Embodiment 11 through Embodiment 14, further comprising steering the vehicle while harvesting an agricultural field.

Embodiment 16: The method of any one of Embodiment 11 through Embodiment 15, further comprising limiting a maximum steering angle of the pair of hubs based at least in part on an extension width of the axle.

Embodiment 17: A non-transitory computer-readable storage medium, the computer-readable storage medium including instructions that when executed by a computer, cause the computer to perform the method of any one of Embodiment 11 through Embodiment 16.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventors. Further, embodiments of the disclosure have utility with different and various vehicle types and configurations.

What is claimed is:

1. A vehicle, comprising:
   a chassis;
   a first axle pivotally coupled to the chassis such that the first axle can tilt from side to side relative to the chassis;
   a first tilt-angle sensor configured to detect a tilt angle of the first axle relative to the chassis;
   a first pair of steerable hubs carried by the first axle, each hub of the first pair of steerable hubs configured to rotate about steering axes relative to the first axle;
   a first steering-angle sensor configured to detect a steering angle of at least one hub of the first pair of hubs relative to the first axle;
   a second axle coupled to the chassis and a second pair of hubs carried by the second axle, wherein the second axle is pivotally coupled to the chassis, and each hub of the second pair of hubs is steerable and configured to rotate about steering axes relative to the second axle;
   a second tilt-angle sensor configured to detect a tilt angle of the second axle;
   a second steering-angle sensor configured to detect a steering angle of at least one hub of the second pair of hubs relative to the second axle; and
   a control system configured to limit a maximum steering angle of the at least one hub based at least in part on a size of tires or tracks carried by the first and second pairs of hubs and the detected tilt angle of at least one of the first and second axle.

2. The vehicle of claim 1, wherein the hubs of the first and second pairs of hubs each carry tires mounted on rims.

3. The vehicle of claim 1, wherein the vehicle comprises a combine harvester, and wherein the chassis is configured to carry a harvesting header.

4. The vehicle of claim 1, wherein the vehicle comprises a tractor.

5. The vehicle of claim 1, wherein the first axle is telescopic, and wherein the control system is configured to limit the maximum steering angle based at least in part on an extension width of the first axle.

\* \* \* \* \*